(12) United States Patent
Fyfe et al.

(10) Patent No.: US 11,691,687 B2
(45) Date of Patent: Jul. 4, 2023

(54) SOLAR WIRELESS COLLECTOR BEACON (DATA HUB)

(71) Applicant: 4iiii Innovations Inc., Cochrane (CA)

(72) Inventors: Kipling William Fyfe, Cochrane (CA); Ben Hilborn, Cochrane (CA); Ken Fyfe, Cochrane (CA)

(73) Assignee: 4IIII INNOVATIONS INC., Cochrane (CA)

( * ) Notice: Subject to any disclaimer, the term of this patent is extended or adjusted under 35 U.S.C. 154(b) by 560 days.

(21) Appl. No.: 16/420,026

(22) Filed: May 22, 2019

(65) Prior Publication Data

US 2019/0363568 A1   Nov. 28, 2019

Related U.S. Application Data

(60) Provisional application No. 62/675,137, filed on May 22, 2018.

(51) Int. Cl.

| | |
|---|---|
| *H02J 7/35* | (2006.01) |
| *H02J 50/00* | (2016.01) |
| *B62J 45/20* | (2020.01) |
| *H04W 4/80* | (2018.01) |
| *H04W 4/021* | (2018.01) |

(Continued)

(52) U.S. Cl.
CPC ............ *B62J 45/20* (2020.02); *B62J 43/30* (2020.02); *B62J 45/40* (2020.02); *B62J 50/22* (2020.02); *G06F 16/909* (2019.01); *H02J 7/35* (2013.01); *H04W 4/021* (2013.01); *H04W 4/80* (2018.02);

(Continued)

(58) Field of Classification Search
USPC ........................................................ 320/101
See application file for complete search history.

(56) References Cited

U.S. PATENT DOCUMENTS

2015/0360740 A1    12/2015  Sarvestani
2016/0039496 A1*   2/2016   Hancock ................. G01S 19/25
                                                  701/60

(Continued)

FOREIGN PATENT DOCUMENTS

| CN | 103078253 A | 5/2013 |
|---|---|---|
| JP | 2007-067533 A | 3/2007 |

(Continued)

OTHER PUBLICATIONS

PCT/IB2019/000692 International Search Report and Written Opinion dated Dec. 13, 2019, 9 pp.

(Continued)

*Primary Examiner* — Bryce M Aisaka
(74) *Attorney, Agent, or Firm* — Cozen O'Connor

(57) ABSTRACT

A solar wireless collector beacon (data hub) and associated method stores source data, received wirelessly from a data source, in a data buffer of the data hub. Sensor data is read from one or more onboard sensors of the data hub and stored as structural and/or environmental data in the data buffer. The environmental data is processed to determine an operating status of a vehicle being used with the data hub and an energy harvester of the vehicle is controlled to harvest energy from the vehicle based on the operating status. One or more of the operating status, the source data, and the environmental data is wirelessly transmitted from the data hub to an external device.

8 Claims, 12 Drawing Sheets

(51) Int. Cl.
  *H04W 40/24*    (2009.01)
  *G06F 16/909*   (2019.01)
  *B62J 50/22*    (2020.01)
  *B62J 43/30*    (2020.01)
  *B62J 45/40*    (2020.01)
(52) U.S. Cl.
  CPC ......... *H04W 40/244* (2013.01); *H02J 50/001* (2020.01); *H02J 2310/40* (2020.01)

(56) References Cited

U.S. PATENT DOCUMENTS

2017/0334522 A1    11/2017   Zahid et al.
2018/0061208 A1*   3/2018    Sala Cunill ............. A61M 5/20

FOREIGN PATENT DOCUMENTS

KR    20120131574        12/2012
WO    WO 2010/092356 A1   8/2010

OTHER PUBLICATIONS

European Patent Application No. 19807255.5 extended European Search Report dated Feb. 9, 2022, 9 pages.
Office Action for Japanese Patent Application No. 2021-515299 dated Feb. 28, 2023, 2 pages.

\* cited by examiner

SOLAR WIRELESS COLLECTOR BEACON (DATA HUB)

RELATED APPLICATIONS

This application claims priority to U.S. Provisional Patent Application No. 62/675,137, titled "Solar Wireless Collector Beacon", filed May 22, 2018, and incorporated herein by reference in its entirety.

BACKGROUND

In performance cycling, it is important to measure and quantify effort and resulting performance. There are many different devices available that may be attached to a bicycle to measure speed, power, and other performance data, and many other devices available that may be attached to the rider to measure heart rate, breathing rate, and other metrics. Results from these devices are typically collected by various wireless computer head units and/or applications running on a smartphone, and the rider must later collect and analyze the data from the separate devices to determine overall performance and results. The performance of the rider is affected by environmental conditions, such as the smoothness of the surface being ridden upon, gradients of the surface, weather conditions (e.g., air temperature, wind direction and speed, etc.). However, the rider does not have this information readily available.

SUMMARY

One aspect of the present embodiments includes the realization that with the availability of more devices for cycling, there is a need to simplify how the data captured by those devices is gathered and analyzed. While some of the data may be handled on different existing platforms (e.g., cycling head units, cell phones, etc.), there is currently no single device available to the general consumer that collects all available data, simplifies uploading of that data, and performs collective analysis of that data. The present embodiments solve this problem by providing a solar wireless collector beacon (referred to as a "data hub" hereafter) that uses electronics (e.g., memory, at least one processor, and built-in sensors) with wireless communication protocols to intelligently aggregate data from nearby sensors and environmental data to quantify a ride. Advantageously, the data hub is a single device that collects data from many sources and transfers that data to a remote server for storage and processing. The data hub may include a display screen and a rechargeable battery that is charged by a solar panel to make the data hub maintenance free. A further advantage is that the data hub may be seamlessly integrated into the mechanical design of the frame, stem or handlebars of a bicycle. In other embodiments, the data hub may be available as an aftermarket product that is easily attached to a bicycle.

A second aspect of the present embodiments includes the realization that many devices require battery power and that batteries need changing. The present embodiments solve this problem by providing a solar wireless collector beacon (data hub) that includes one or more energy harvesters, such as a solar panel and generators that harvest energy from rotary motion, to charge a rechargeable battery. Advantageously, the data hub manages its own power and is a self-contained device.

A third aspect of the present embodiments includes the realization that bicycles and many other vehicles do not have a unique identifier or serial number. The present embodiments solve this problem by including a unique identifier in the solar wireless collector beacon (data hub), where the data hub detects alteration or tampering with this unique identifier. Advantageously, the data hub may also operate as a beacon that includes the unique identifier that allows any vehicle configured with the data hub to be tracked.

A primary function of the data hub is to capture and record information about the bicycle, the cyclist, surrounding cyclists, and/or surrounding environment. The data hub stores a unique identifier (ID) that may be queried or transmitted as a wireless beacon. This wireless beacon may be used for locating lost or stolen bicycles using a crowd-sourced or dedicated finder network. Particularly, when integrated into a frame of a bicycle, the data hub provides a more secure way of identifying and tracking the bicycle.

The collected data may be made available to an end user (e.g., the rider/cyclist), and at least part of the collected data may also be made available (with user authorization and/or anonymization) to one or more of a manufacturer of the bicycle, a retailer of the bicycle shop, and municipalities. In today's connected world, there is the ability to analyze large data sets, but currently resources are lacking to collect and consolidate this information. The data hub will act as this central point so that the data describing use patterns, product and rider histories and the ability to improve rider safety through tracking and alert functions, can be consolidated into a permanent fixture on the bicycle. The data hub is capable of collecting and presenting a wide range of information relating to the cyclist, including inferred information based upon parameters of the environment of the ride.

In an embodiment, a solar wireless collector beacon (data hub), includes a processor, a memory in electronic communication with the processor, a unique identifier, stored in the memory, a communicator in electronic communication with the processor and operable to communicate wirelessly using at least two different protocols, communicate through a network to a server, and identify other wireless devices near the data hub. The data hub also includes a plurality of onboard sensors configured to sense an environment of the data hub, the plurality of onboard sensors including one or more of an accelerometer, altimeter, humidity sensor, a photosensor, a camera, a satellite navigation receiver, and a thermometer. The data hub also includes at least one solar panel, a rechargeable battery, and a power circuit for charging the rechargeable battery using power from the at least one solar panel and for powering the processor, the memory, the communicator, and the plurality of onboard sensors from power stored in the rechargeable battery. The data hub also includes a housing, shaped to integrate with a vehicle (e.g., a bicycle), for containing the processor, the memory, the communicator, the plurality of onboard sensors, the at least one solar panel, the rechargeable battery, and the power circuit. The data hub also includes a data buffer configured as part of the memory, and firmware, having machine readable instructions stored in the memory that, when executed by the processor, control the processor to: determine, at intervals, a current location of the data hub and store the current location in the data buffer; read, at intervals, sensor data from the plurality of onboard sensors and store the sensor data in the data buffer; determine an environmental status of the vehicle based at least in part upon the sensor data; and transmit, at intervals, a message including the unique identifier, the current location, and the environmental status, to a remote server.

In another embodiment, a wireless collector beacon method includes: storing, in a data buffer of a data hub, source data received wirelessly from a data source; reading sensor data from one or more onboard sensors of the data hub and storing, in the data buffer, environmental data generated from the sensor data; processing, by the data hub, the environmental data to determine an operating status of a vehicle (e.g., a bicycle) being used with the data hub; controlling, by the data hub, an energy harvester of the vehicle based on the operating status; and wirelessly transmitting, from the data hub to an external device, one or more of the operating status, the source data, and the environmental data.

DETAILED DESCRIPTION OF THE EMBODIMENTS

In the following examples, a data hub is integrated with, or connected to, a vehicle that is a bicycle and operates to collect data for a ride. However, the data hub may be configured with other vehicles and devices without departing from the scope hereof. For example, the data hub may be configured with, or attached to, a skateboard, to collect data while a rider skates. In these examples, the "ride" represents the activity being monitored, wherein the data hub operates to collect all relevant and available data that may relate to that ride.

Figure 1:
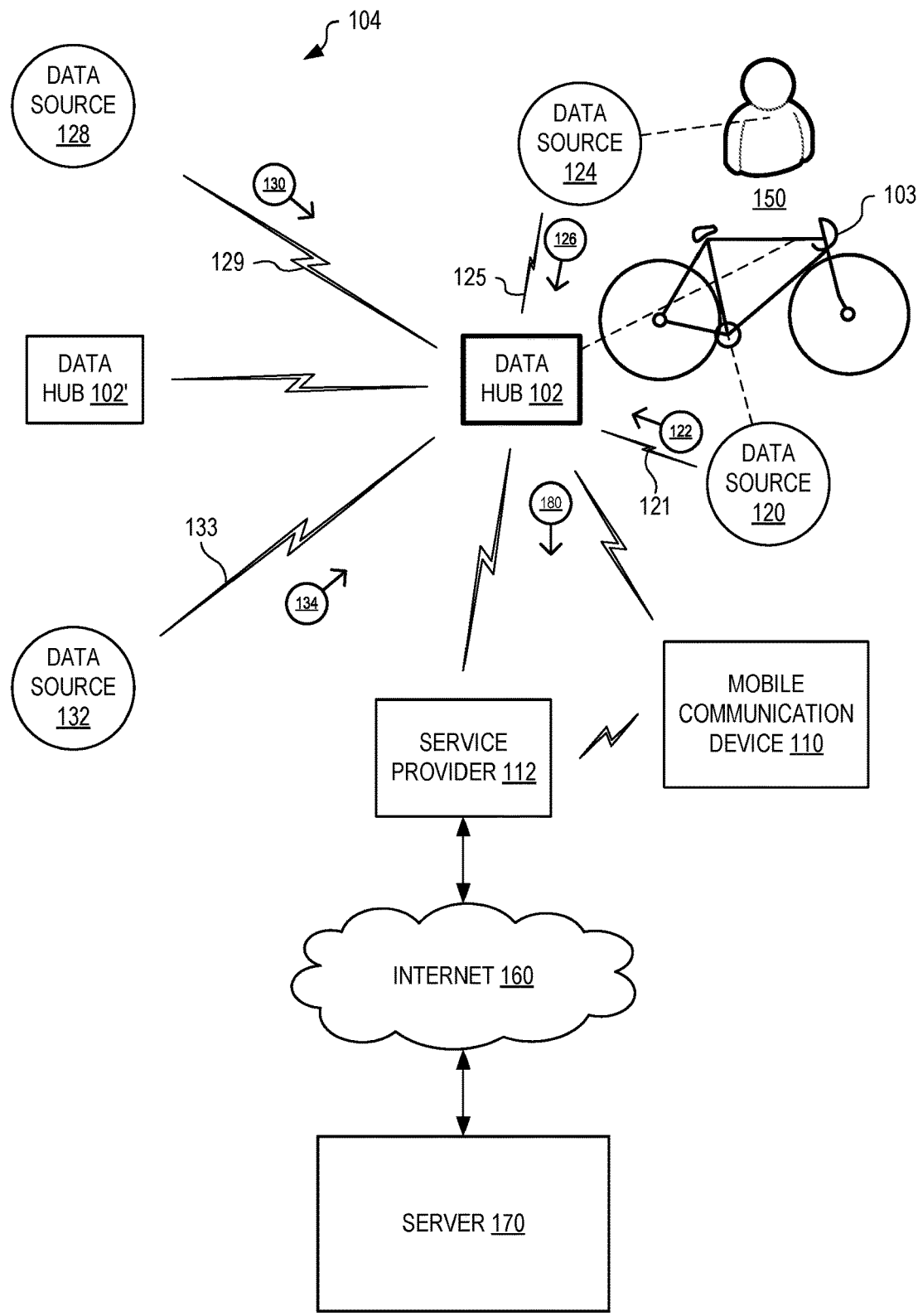
FIG. 1 is a schematic diagram showing one example solar wireless collector beacon (data hub) integrated with (or attached to) a bicycle, in an embodiment.

FIG. 1 is a schematic diagram showing one example solar wireless collector beacon (hereinafter data hub) 102 integrated with (or attached to) a bicycle 103 to collect information of use (e.g., a ride) of the bicycle by a cyclist 150. Although the following examples focus primarily upon collecting data during a ride, data hub 102 may also collect data when bicycle 103 is not being ridden, such as when bicycle 103 is being stored, transported and/or moved. However, data hub 102 may collect less data (e.g., listening and sensing less frequently) when not being ridden.

Data hub 102 collects data from a plurality of data sources 120, 124, configured with and/or attached to one or both of bicycle 103 and cyclist 150 (e.g., a user/rider of bicycle 103). Data hub 102 may also receive wireless signals 129, 133 from other data sources 128, and 132 associated with other riders, vehicles, and data sources within environment 104. Data hub 102 may also include one or more onboard sensors (e.g., see onboard sensors 226 of FIG. 2) that detect characteristics of environment 104. In one example, data source 120 is a power meter attached to or integrated with bicycle 103, data source 124 is a heart rate monitor worn by cyclist 150, data source 128 is a power meter attached to another bicycle riding within environment 104, and data source 132 is a status transmission from a vehicle (e.g., a car, a truck, a pacer vehicle, etc.) within environment 104.

In this example, data hub 102 receives a wireless signal 121 with power data 122 from the power meter integrated with bicycle 103, and a wireless signal 125 with heart-rate data 126 from the heart-rate monitor worn by cyclist 150. The power meter and the heart-rate monitor may be registered with data hub 102, and therefore data hub 102 decodes corresponding power data 122 from wireless signal 121 and heart-rate data 126 from wireless signal 125. Data hub 102 may store power data 122 and heart-rate data 126 within an internal memory, and/or relay power data 122 and heart-rate data 126 to a mobile communication device 110 and/or a server 170. Data hub 102 may not decode and/or record data 130 of wireless signal 129 or data 134 of wireless signal 133, since the corresponding devices are not registered with data hub 102. For example, each data source 120, 124, 128, and 132, may have a unique device ID that is included within each wireless signal (e.g., wireless signals 121, 125, 129, and 133) that it transmits. Data hub 102 may include a table (list) of device IDs of devices that are registered, such that it may determine which wireless signals to decode. Accordingly, data hub 102 may not store all of data 130 and data 134. However, upon receiving wireless signal 129 and 133, data hub 102 may determine that other data sources 128, 132 (and therefore corresponding vehicles or persons) are nearby. For example, upon receiving wireless signal 129, data hub 102 may determine, based on a device ID included within wireless signal 129, that the data source is a bicycle power meter that is not registered with data hub 102. Thus, data 130 is not specifically relevant to performance of cyclist 150, but presence of wireless signal 129 indicates that another cyclist is within environment 104 (e.g., nearby). Similarly, wireless signal 133 indicates that the data source 132 is a vehicle information transmitter that is not registered with data hub 102, but indicates that a vehicle is within environment 104 (e.g., nearby). In certain embodiments, data hub 102 may infer the presence of other vehicles and riders within environment 104. In other embodiments, one or both of a mobile communication device 110 and a server 170 may receive certain information from wireless signals 129 and 133 and infer presence of other vehicles and riders. In some cases, wireless signal 133 may be a long-range wireless signal using LTE-M protocol, for transferring data to other vehicles, data centers, individuals, and so on. Based upon wireless signals 129 and 135, data hub 102 and/or server 170 may infer that cyclist 150 is riding with at least one other rider and has an accompanying vehicle.

In this example, where wireless signal 129 is received frequently, at intervals, by data hub 102, data hub 102 may infer that cyclist 150 is riding with another cyclist (since continuing presence of wireless signal 129 indicated that they remain together). Where data hub 102 detects multiple non-registered power meter signals (e.g., similar to wireless signal 129), data hub 102 may determine that cyclist 150 is participating in a race and/or group cycling activity. Data hub 102 may record such inferred information in association with power data 122 and heart-rate data 126 of cyclist 150, thereby providing additional context for the activity of cyclist 150.

Data hub 102 may read, at intervals, sensed data from the onboard sensors (e.g., see onboard sensors 226 of FIG. 2) that defines characteristics (e.g., roughness of surface, gradient, temperature, and so on) of environment 104 in which bicycle 103 is operating. Data hub 102 may store characteristics of environment 104 in association with power data 122 and heart-rate data 126 of cyclist 150 to further characterize the activity of cyclist 150.

Data hub 102 may send accumulated data to mobile communication device 110 where it may be manipulated, otherwise processed, and/or viewed by cyclist 150. In turn, mobile communication device 110 may send the accumulated data and inferred information to server 170, via one or both of a service provider 112 and the Internet 160. With appropriate permissions, this data may be provided to bicycle manufacturers, distributers and retailers (see Manufacturer and Retail Reports, below). In certain embodiments, data hub 102 is configured with long-range communication capability (e.g., one or more of cellular LTE-M, LoRA, Sigfox, etc.) such that data hub 102 communicates with server 170, via a service provider (e.g., service provider 112). LTE-M is a low-power wide-area (LPWA) technology which supports the Internet of things (IoT) through lower device complexity and provides extended coverage, while allowing the reuse of the LTE installed base. The LTE-M standard is published in the Release 13 specification by 3GPP. However, data hub 102 may use other protocols and wireless technologies without departing from the scope of the embodiments herein.

Figure 2:
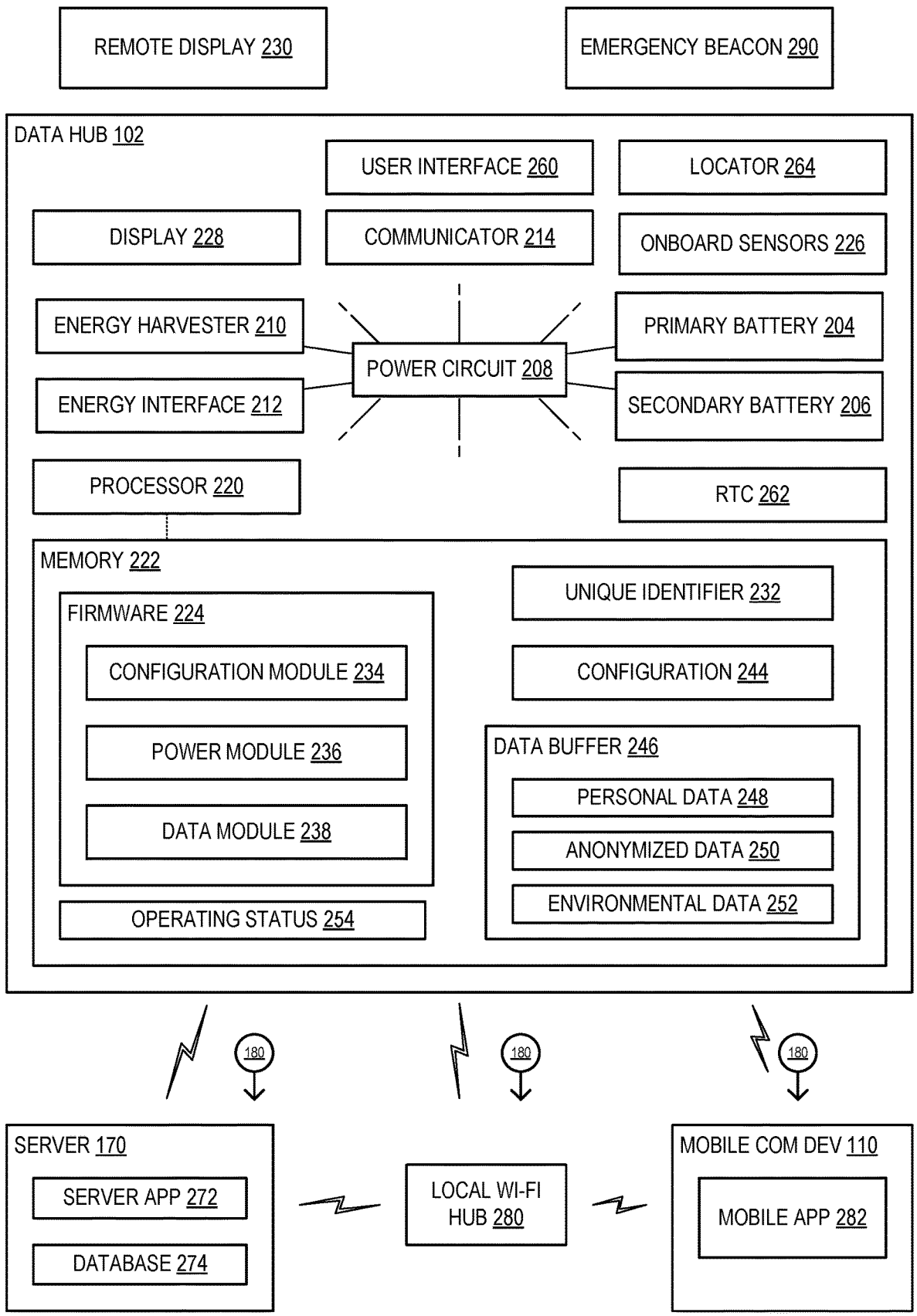
FIG. 2 is a functional block diagram showing the data hub of FIG. 1 in further example detail, in an embodiment.

FIG. 2 is a functional block diagram showing solar wireless collector data hub 102 of FIG. 1 in further example detail. Data hub 102 may be implemented as a low-power system-on-chip (SOC) and may include a primary battery 204 and/or a secondary battery 206 that electrically interface with a power circuit 208 that manages power usage and monitors capacity of batteries 204 and/or 206 to provide power to components of data hub 102. Data hub 102 may also include one or more energy harvesters 210 (e.g., energy harvesting transducers such as solar cells, piezoelectric, dynamos, and/or generators) that electrically connect to power circuit 208, which may use the harvested power to charge secondary battery 206. In one example, energy harvester 210 is configured to extract energy from rotary motion generated by one or more of wind (e.g., wind turbine), at a bottom bracket (e.g., crank) of bicycle 103, and from the pedals rotating about the cranks.

Data hub 102 may also include an energy interface 212 that allows secondary battery 206 to be charged from other power sources, such as an external power source via an external USB port. For example, energy interface 212 may be electrically connected, or magnetically coupled, to a plug-in adapter to charge secondary battery 206. In certain embodiments, energy interface 212 may provide power from secondary battery 206 to other components of bicycle 103, including, but not limited to, an electronic shifter, a power meter, a bike head unit, lights, suspension control units, and electric assist motors. In these embodiments, secondary battery 206 may be sized to operate as a central power source for the bicycle based on power requirements of these other components.

Power module 236 may, at intervals, determine an operating status 254 of data hub 102 and/or bicycle 103 based upon environmental data 252 (e.g., sensor data captured from onboard sensors 226) and/or personal data 248. For example, power module 236 may determine an angle of bicycle 103 to determine whether cyclist 150 is riding down a hill. In another example, power module 236 may process personal data 248 to determine an amount of effort being exerted by cyclist 150. In another example, power module 236 may determine intensity and frequency of lateral movement of a frame of the bicycle 103 to determine whether cyclist 150 is standing to apply more power to pedals of bicycle 103. Accordingly, operational status 254 may indicate current riding conditions being experienced by cyclist 150.

Power module 236 may control, based on operating status 254, energy harvester 210 to harvest energy at a rate that ensures that secondary battery 206 has a sufficient level of power for operation of bicycle 103 without overly increasing effort required by cyclist 150 to recharge secondary battery 206. In embodiments where energy harvester 210 is a dynamo or generator that is incorporated within a wheel or crank of a bicycle, energy harvester 210 may be configured to continuously capture a small percentage of available energy during operation (e.g., a ride) of bicycle 103. Alternatively, energy harvester 210 may be controlled by power circuit 208 to capture a greater percentage of available energy when operating status 254 indicates that bicycle 103 is braking and/or going downhill. Power circuit 208 may control energy harvester 210 to not harvest energy when operating status 254 does not indicate that bicycle 103 is braking or going downhill. That is, power module 236 may control energy harvester 210 to harvest only unused/unwanted energy (that is, when excess energy is available) from bicycle 103 to recharge secondary battery 206 without adverse impact upon the performance of cyclist 150. Cyclist 150 may interactively define configuration 244 to control operation of energy harvester 210 based upon a desired/acceptable performance impact. For example, cyclist 150 may interact with user interface 260 of data hub 102 and/or mobile application 282 running on mobile communication device 110, to set parameters of configuration 244 to control when energy harvester 210 is activated to harvest energy. Other wireless devices may also be used to define configuration 244, for example, by interacting (e.g., via web interface 307, FIG. 3) with server application 272 of server 170 to define configuration 244.

In embodiments where data hub 102 is not integrated into bicycle 103 (e.g., data hub 102 is an add-on product attached to bicycle 103), one or both of primary battery 204 and secondary battery 206 may be omitted when data hub 102 is powered from a central battery unit of bicycle 103 (e.g., where bicycle 103 has a central power source that powers other electronic components of bicycle 103).

Data hub 102 may include a communicator 214 that implements wireless communication (transmitting and receiving) using one or more protocols, such as Bluetooth Low Energy (BLE), ANT+, vehicle to everything (e.g., V2X, B2X, B2V, etc., using one or more of IEEE 802.11p, LTE-V2X, LTE-M, and so on). BLE is a wireless protocol that enables two-way wireless communication between low-powered devices. Although BLE is used in the following example, the Bluetooth protocol (not low energy) may also be used. ANT+ is a multicast wireless sensor network technology that is conceptually similar to BLE, but is oriented towards ultra-low power and more flexible connectivity and mesh networking. V2X, B2X, and B2V are dedicated short-range communication (DSRC) protocols based upon IEEE 802.11p and may be used by vehicles (including motor cycles and bicycles) to communicate with other vehicles, pedestrians, and infrastructure. For example, a bicycle may communicate information to other vehicles (including other bicycles) and pedestrians, etc. In certain embodiments, communicator 214 is a digital wireless radio circuitry/module implementing one or more wireless transceivers (e.g., an integrated circuit such as Nordic Semiconductors nRF52).

In certain embodiments, communicator 214 may also be configured to receive local wireless 802.11 (Wi-Fi) signals and to detect (e.g., sniff) SSIDs and similar identifiers of nearby Wi-Fi networks. Detected SSIDs may be used for determining an approximate location of data hub 102, for example. Communicator 214 may implement other wireless protocols without departing from the scope hereof. However, many sensor-based devices use one or more of BLE, ANT+, V2X, B2X, etc. for communication. For example, a bicycle power meter on a crank of a bicycle may wirelessly communicate sensed power applied to a pedal to a cycle head unit located on the handlebar of the bicycle using the ANT+ protocol. A heart-rate monitor chest strap may communicate a sensed heart rate to a watch using the BLE protocol. Accordingly, data hub 102 may detect wireless signals of such devices when they are within wireless range. In the example of FIG. 1, wireless signal 129 is an ANT+ signal generated by a power meter of a nearby bicycle, and wireless signal 133 is a V2X signal from a nearby vehicle.

Data hub 102 may include at least one digital processor 220 and memory 222 that may be implemented using one or more of RAM, ROM, FLASH, DRAM, and so on. In certain embodiments, processor 220 and memory 222 may be combined on a single chip. Memory 222 stores firmware 224, configuration 244, data buffer 246, and a unique identifier (ID) 232. Firmware 224 (e.g., software) includes machine-readable instructions that, when executed by the processor 220, control the processor 220 to implement functionality of data hub 102 described herein. Firmware 224 may include a configuration module 234, a power module 236, and a data module 238. Configuration module 234 may cause processor 220 to interactively define a configuration 244 of data hub 102. Power module 236 may cause processor 220 to control, at least in part, operation of power circuit 208 to monitor power levels of, and control power usage from, primary battery 204, and monitor power levels of, control charging of, and control power usage from, secondary battery 206. Data module 238 may cause processor 220 to control communicator 214 to receive wireless signals (e.g., wireless signals 121, 125, 129, and 133) and to communicate with one or more of mobile communication device 110, service provider 112, and server 170. Data buffer 246 may be implemented as a cyclic buffer for storing one or more of personal data 248, anonymized data 250, and environmental data 252. For example, data buffer 246 may be used to store personal data 248, anonymized data 250, and environmental data 252 as it is collected until the data may be transferred to another device (e.g., mobile communication device 110 and/or server 170). Data hub 102 may include a real-time clock (RTC) 262, implemented as a chip or part of processor 220 for example. RTC 262, once set to the current time by configuration module 234 communicating with server 170 for example, allows data module 238 to time-stamp collected data stored in data buffer 246 with the time it is received or determined. The real-time clock may, at intervals, synchronize with mobile communication device 110, when paired and within communication range.

Data module 238 may process received wireless signals (e.g., wireless signals 121, 125, 129, and 133) and generate personal data 248 and/or anonymized data 250. For example, where data module 238 receives wireless signals 121 and/or 125, data module 238 generates personal data 248 based at least in part upon power data 122 and heart-rate data 126. That is, where data module 238 determines that wireless signals 121 and 125 are from registered devices (e.g., based upon a unique ID of the device received in the wireless signal), data module 238 decodes corresponding power data 122 and heart-rate data 126 to generate personal data 248. Where data module 238 determines that wireless signals 129 and 135 are not from registered devices (e.g., based upon a unique ID and/or a device ID received in the wireless signals), data module 238 generates anonymized data 250 indicative of the signal presence and/or of the device presence. In one example, anonymized data 250 may generate anonymized data 250 to include a first unique ID and/or a first device ID received in wireless signal 129 with a measured signal strength of wireless signal 125, and to include a second unique ID and/or a second device ID received in wireless signal 135 with a measured signal strength of wireless signal 135. In certain embodiments, data module 238 may define a number and type of devices within environment 104 based upon received wireless signals. For example, based upon received wireless signals 129 and 135 with included device types of power meter and vehicle, respectively, data module 238 may determine that one unknown cyclist is within environment 104 and that one unknown vehicle is within environment 104, and generate anonymized data 250 to indicate this.

A unique identifier (ID) 232 (e.g., a unique serial number) uniquely identifies data hub 102. Advantageously, where data hub 102 is integrated with bicycle 103 (or any other type of vehicle or asset), unique ID 232 may also be used to uniquely identify bicycle 103 (or other vehicle or asset). In certain embodiments, data hub 102 may detect when tampering occurs. For example, processor 220, under control of firmware 224, may send an alert to server 170 when it detects that data hub 102 is compromised. Tampering may be detected when one or more of the following occur: strain within data hub 102 exceeds a defined threshold, a membrane has been broken, the system electronics have been compromised, and checksums/hashes defined for the firmware, unique identifier 232, and configuration 244 are incorrect.

In certain embodiments, data hub 102 may include a display 228 for displaying a status, data fields, and/or other information collected and/or inferred by data hub 102. For example, firmware 224 may cause processor 220 to control display 228 to show one or more of a current speed, power, average speed, average power, distance, heartrate, average heartrate, time, elapsed time, etc. For example, cyclist 150 may interact with one or both of user interface 260 and mobile communication device 110 to define configuration 244 to control display of information on display 228. In certain embodiments, particularly where data hub 102 is integrated with bicycle 103, display 228 may be omitted from data hub 102, and data hub 102 may communicate wirelessly with a remote display 230, positioned elsewhere on bicycle 103 for example, to show similar information. In certain embodiments, data hub 102 may also send similar information to mobile communication device 110 for output (e.g., via a display of mobile communication device 110 or audibly via speakers and/or headphones of mobile communication device 110) to cyclist 150. Data hub 102 may also send similar information to other devices (e.g., heads-up displays, watches, etc.) worn or used by cyclist 150.

Configuration module 234 controls processor 220 to interact with cyclist 150, via user interface 260 and display 228 (remote display 230) and/or via mobile communication device 110, to define configuration 244 to control operation of data hub 102. For example, during initial operation of data hub 102, cyclist 150 may interactively identify and/or classify wireless signals 121 and 125 when detected by communicator 214, to register the corresponding power meter (data source 120) and heart-rate monitor (data source 124) with data hub 102.

Data hub 102 may include one or more onboard sensors 226 selected from the group including an accelerometer, a rate gyro, a magnetometer, a barometer, a temperature sensor, a light sensor, a humidity sensor, and so on. Data module 238 may also control processor 220 to read, at intervals (e.g., accelerometer(s) at 100 Hz, locator 264 at 0.2 Hz, and so on), one or more of onboard sensors 226 to determine characteristics of environment 104. Data module 238 may also cause processor 220 to send, via communicator 214, messages 180 including data from data buffer 246.

In certain embodiments, data hub 102 includes a locator 264 that determines a current geographic location of data hub 102. Locator 264 may be implemented as a global positioning satellite (GPS) receiver that determines the current location of data hub 102 based upon received satellite signals. For example, data module 238 may, at intervals, invoke locator 264 to determine a current location, and data module 238 may store the determined location, with a current time determined from RTC 262, as environmental data 252 in data buffer 246. Locator 264 may be omitted in certain embodiments, whereby data hub 102 may interact with other devices to receive location information. For example, where mobile communication device 110 is a smartphone that includes a GPS receiver, mobile application 282 may determine the current location of the smartphone and send that location to data hub 102. In another example, when mobile communication device 110 receives message 180 from data hub 102, mobile application 282 may determine and store a current location with data received from data hub 102, thereby tagging the data with a current location.

Data module 238 may cause processor 220 to control communicator 214 to receive wireless signals (e.g., wireless signals 121, 125, 129, and 133) from environment 104. In certain embodiments, data hub 102 may communicate with a second data hub 102' that is also within environment 104. In one embodiment, where second data hub 102' is attached to, or integrated with, another bicycle, data hub 102 and data hub 102' may exchange one or both of anonymized data 250 and/or environmental data 252. For example, where data hub 102' has determined a current location, data hub 102' may send its current location to data hub 102, wherein data hub 102 may infer its location to be near that of second data hub 102'. In another embodiment, where data hub 102' is static (e.g., attached to a post or structure along a cycling route or street), second data hub 102' may be configured with its location, which it may transmit (e.g., in a wireless data hub or is response to a request) to data hub 102. Accordingly, data hub 102 may learn its current location from proximity to second data hub 102'. Further, second data hub 102' may detect proximity of data hub 102, or receive a communication from data hub 102, and thereby track a number of cyclists using the route near second data hub 102'.

In certain embodiments, data hub 102 also communicates with a local hub 280 (e.g., a Wi-Fi hub that is configured to relay messages 180 from data hub 102 to server 170). For example, where data hub 102 has sufficient power available for running the Wi-Fi protocol, data hub 102 may connect to and communicate with local hub 280 when in range.

A plurality of data hubs 102 that are within wireless communication range of one another may operate as a herd, where in one data hub 102 of the herd may provide location information to other members of the herd. In certain embodiments, mobile communication device 110 may notify cyclist 150 when data hub 102 becomes separated. Where data hubs 102 form a herd, server 170 may also provide herd tracking, notifying a corresponding cyclist 150 when data hub 102 is separated from the herd and/or extending the moving heard.

Figure 3:
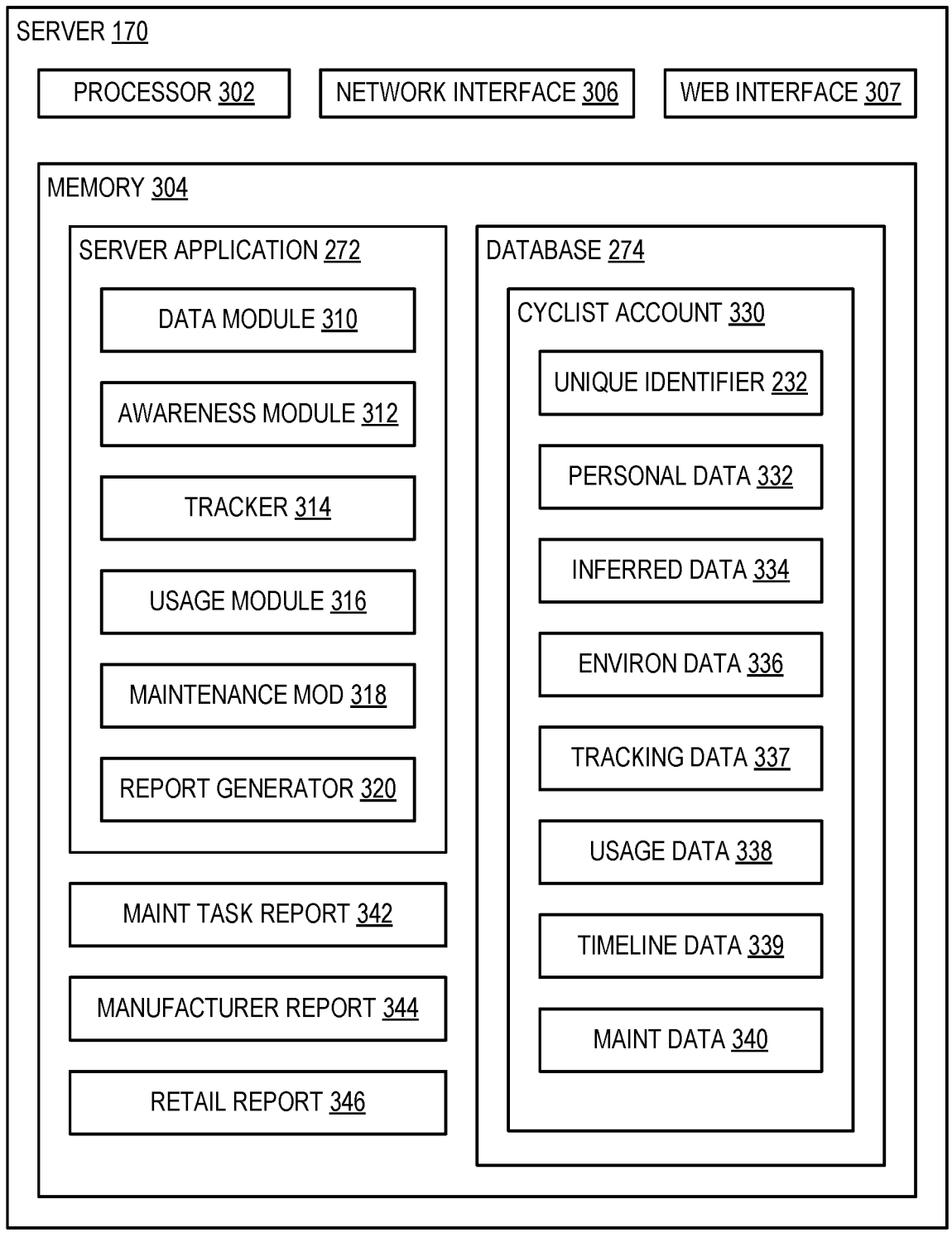
FIG. 3 is a schematic diagram illustrating the server of FIG. 1 in further example detail, in an embodiment.

FIG. 3 is a schematic diagram illustrating server 170 of FIG. 1 in further example detail. Server 170 is a networked computer and may include a processor 302, a memory 304 communicatively coupled with processor 302, a network interface 306, and a web interface 307. Memory 304 may store server application 272 (e.g., software) and database 274. However, database 274 may be implemented, at least in part, external of server 170 without departing from the scope hereof.

Cyclist 150 may register, via web interface 307 for example, unique ID 232 of data hub 102 with server 170 to create a cyclist account 330. As shown, cyclist account 330 may be created within database 274 to store, in association with unique ID 232, personal data 332, inferred data 334, environmental data 336, and usage data 338, where personal data 332 includes personal data 248 received from data hub 102, inferred data 334 may include anonymized data 250 received from data hub 102, and environmental data 336 includes environmental data 252 (e.g., data from onboard sensors 226) received from data hub 102. For example, server 170 receives messages 180 from a plurality of data hubs 102 and stores the received data in the corresponding cyclist account 330 in database 274.

Server application 272 may include a data module 310, an awareness module 312, a tracker 314, a usage module 316, a maintenance module 318, and a report generator 320. Data module 310 controls processor 302 to receive messages 180 from data hubs 102 and store the received data in the corresponding cyclist account 330 based upon unique ID 232. For example, where message 180 includes environmental data 252 captured by one or more onboard sensors 226 and/or locator 264 of data hub 102, Awareness module 312 may implement one or more algorithms that control processor 302 to analyze data as it is received within messages 180 to generate additional inferred data 334. In one example, where message 180 indicates a first device ID, a first device type, and a corresponding signal strength (in a range of one to five, five being the strongest) of four, awareness module 312 may look-up the first device type to determine that the wireless signal was from a power meter, and thereby infer that another cyclist is near data hub 102.

In certain circumstances, awareness module 312 may also infer a location of data hub 102 from location information of other data hubs and/or devices. For example, where data module 238 has not, for a defined interval, received location data from data hub 102 (e.g., when data hub 102 is unable to determine its location directly using locator 264), awareness module 312 may search within anonymized data 250 for a unique ID and device type ID recently received within a wireless signal by data hub 102, with a device ID and device type ID registered with a second data hub. From the match, awareness module 312 may infer that data hub 102 is near the second data hub, and thereby use a recent location determined by the second data hub (e.g., as stored in a corresponding cyclist account of the second data hub) as the location of data hub 102.

Awareness module 312 may also analyze environmental data 336 to determine a type and severity of terrain being traversed by bicycle 103. For example, where environmental data 336 includes one or both of accelerometer data and/or gyro data captured from one or more onboard sensors 226 of data hub 102, awareness module 312 may determine one or more of surface smoothness, variation in surface smoothness, surface type, variation in surface type, terrain type, variation in terrain type, gradient, variation in gradient, variation in direction, and so on. Thereby, awareness module 312 may construct timeline data 339 of difficulty of terrain being traversed by bicycle 103. Particularly, timeline data 339 is based upon environmental data 336 captured during the ride, and is a statistic desired by many riders.

Tracker 314 may be invoked, at intervals, by server application 272 to track movement of data hub 102 based upon received, or inferred, location information of data hub 102. For example, tracker 314 may process one or both of inferred data 334 and/or environmental data 336 for cyclist account 330 associated with data hub 102 to generate tracking data 337, stored in database 274 in association with cyclist account 330, and that defines a path and timeline of movement of data hub 102. Tracking data 337 thereby defines a history of movement of data hub 102 and bicycle 103. Tracking data 337 may be combined with difficulty of terrain information determined by awareness module 312 to further characterize and/or categorize the ride and performance of cyclist 150.

Tracking data 337 and difficulty of terrain information determined by awareness module 312 may be further combined with personal data 332 and environmental data 336 to better understand and categorize the performance of cyclist 150. This combined and complete information may be used to better track analyze and monitor training by cyclist 150, and may also show how cyclist 150 worked with training partners. For example, inferred data 334 may be analyzed to determine how many other cyclists are riding near cyclist 150. Further, based upon IDs of devices received by data hub 102, awareness module 312 may also determine if they are the same or changing cyclists. For example, where the same unregistered heart-rate device is detected through the ride, awareness module 312 may determine that cyclist 150 and this other cyclist are riding together. Further, based upon signal strength of the corresponding wireless signals and effort being exerted by cyclist 150 (e.g., based upon power meter data stored within personal data 332, awareness module 312 may also determine when cyclist 150 is drafting behind this other cyclist and when cyclist 150 takes a turn in front. In another example, awareness module 312 may process power data within personal data 332 and terrain data of environmental data 336 to determine how often, when, and under what conditions and/or circumstances, cyclist 150 stands to pedal. Further, awareness module 312 may also determine an amount of sway imparted to bicycle 103 by cyclist 150, and under what conditions and/or circumstances.

Awareness module 312 may be invoked to monitor compliance with one or both of medical advice, and insurance rules dictating lifestyle. For example, the characteristics and/or categories of the ride and performance of cyclist 150 may provide evidence of compliance by cyclist 150 to prescribed activity (or failure to comply with inactivity). Onboard sensors 226 may detect a crash occurring, and firmware 224 may use communicator 214 to report the crash to server 170 when cyclist 150 is unresponsive. For example, firmware 224 may send an emergency alert to server 170 containing a current location of data hub 102 based upon locator 264. Server 170 may then notify emergency services to the aid of cyclist 150 based upon the received current location. Data hub 102 thereby enhances safety of cyclist 150 by detecting and reporting when cyclist 150 crashes or is involved in an accident.

Maintenance

Server application 272 may invoke usage module 316 to analyze one or more of personal data 332, inferred data 334, and environmental data 336 and generate usage data 338 indicative of usage and/or wear of bicycle 103 and/or components (e.g., brakes, gear selectors, chain, bearings, etc.) attached to bicycle 103. For example, usage data 338 may indicate one or more of types of trails ridden by cyclist 150, how often, duration, speeds, performance intensity, and so on. Usage module 316 may also generate usage data 338 to indicate levels of stress applied to bicycle 103 by cyclist 150. For example, where cyclist 150 frequently climbs steep hills over a rough terrain while standing from the saddle to apply large forces to the pedals, usage module 316 may determine that wear on bicycle 103 is significantly greater than wear on a bicycle used mostly for flat smooth terrain over the same distance. Maintenance module 318 may apply determined usage characteristics to a wear model of bicycle 103 (e.g., as defined by the manufacturer) to determine recommended maintenance intervals for bicycle 103 based upon actual usage. For example, maintenance module 318 may generate a maintenance task report 342 that is sent to cyclist 150 and one or more of an email, a text, and a notification via mobile communication device 110 and mobile application 282 for example.

Cyclist 150 (or a mechanic of cyclist 150) may interact with mobile application 282 to indicate maintenance performed on (or changes and modifications made to) bicycle 103, wherein maintenance module stores the performed maintenance and/or modification a maintenance data 340. Mobile application 282 may then transfer the maintenance details to server 170. Alternatively, cyclist 150 may interact with web interface 307 of server 170 to enter details of maintenance performed on (or changes and modifications made to) bicycle 103. Maintenance module 318 may process one or more of personal data 332, inferred data 334, environmental data 336, usage data 338, and maintenance data 340 to determine when bicycle 103 should next be serviced and generate maintenance task report 342 to notify cyclist 150 of such service needs. In certain embodiments, maintenance module 318 may send maintenance task report 342 to mobile application 282 that causes mobile application 282 to display one or more notifications of upcoming service requirements for bicycle 103 based upon usage data 338 and maintenance data 340. Where environmental data 336 indicates that bicycle 103 was involved in a recent crash, maintenance module 318 may generate maintenance task report 342 to instruct cyclist 150 to perform certain checks on bicycle 103 and/or to replace certain components that, based upon the environmental data 336 (e.g., forces and movements sensed by onboard sensors 226) indicate a severity of the crash. Where data hub 102 is integrated with bicycle 103 during manufacture of bicycle 103, data hub 102 records all events that bicycle 103 is involved in, including event occurring during shipping, during sales, during storage, and during use. Advantageously, capture of this data by data hub 102 provides a full history of events for bicycle 103.

Manufacturer and Retail Reports

Manufacturers and retailers of bicycles and bicycle equipment rarely receive detailed feedback on how a particular bicycle is being used. Typically, the manufacturers and retailers only receive reports of faults with products once they have been sold. Through server 170, manufacturers and/or retailers may receive detailed statistical information of how their brands, models, and components are being used, based upon quantitative measurements by data hub 102. Such information is far superior to conventional surveys used by manufactures and retailer to receive feedback.

Manufacturers and retailers may have accounts with server 170 that allow them to request reports on their products. For example, server application 272, through interaction with a manufacturer and/or a retailer, may invoke report generator 320 to generate one or both of a manufacturer report 344 and a retail report 346. When invoked, report generator 320 analyzes a plurality of cyclist accounts 330 within database 274 to generate manufacturer report 344. For example, report generator 320 may select ones of cyclist accounts 330 within database 274 that correspond to one of a particular brand of bicycle, a particular model of bicycle, a particular component, and so on. Report generator 320 then processes usage data 338 and maintenance data 340 of selected cyclist accounts 330 and generates statistics on how that particular brand of bicycle, model of bicycle, and/or bicycle component is being used. For example, report generator 320 may generate manufacturer report 344 for a particular model of bicycle, accumulating statistical data that may include one or more of trails where the bicycles are ridden (e.g., environmental data 252/336), terrain types where the bicycles are ridden, surface types where the bicycles are ridden, effort levels used in the rides, speeds used in the rides, and so on. For a retailer, report generator 320 may generate retail report 346 corresponding to a range of bicycle models, providing statistics on use of these bicycles on trails in an area around the retail location. For example, for a retailer based in Moab, retail report 346 may provide statistics on the brands and models of bicycles used on trails in that area. In another example, retail report 346 may detail use of bicycles sold by that retailer in that area. In another example, a manufacturer may request manufacturer report 344 with statistics for a particular brand and model of bicycle used on trails in a particular area and indicating retail locations where those bicycles were purchased. Manufacturer report 344 and/or retail report 346 may include other information such as a time of year the bicycles are sold, price information, and buyer demographics, for example.

Security

Since data hub 102 may be integrated with bicycle 103 during manufacture, data hub 102 is inseparable from the frame of bicycle 103. Further, since data hub 102 includes unique ID 232, bicycle 103 may be identified by receiving a signal containing unique ID 232 from a transmitted wireless signal beacon and/or by requesting unique ID 232 by interacting with data hub 102. Accordingly, bicycle 103 may be identified (e.g., an owner determined) by receiving unique ID 232 from data hub 102, and querying server 170, for example. Therefore, data hub 102 adds trackability to bicycle 103.

Further, since data hub 102 may periodically determine and record its current location (e.g., using locator 264 and/or other location methods), data hub 102 may track its movements. Data hub 102 may report those movements to server 170 when communication path is available. For example, data hub 102 may use communicator 214 to send tracking information to server 170 via one or more of mobile communication device 110, service provider 112, local hub 280, and Internet 160. For example, any smartphone running the appropriate application may receive communications from data hub 102 and relay that information to server 170. Advantageously, where cyclist 150 reports bicycle 103 stolen, server 170 may send any tracking information received from (or about) data hub 102 to cyclist 150. For example, server 170 may notify cyclist 150 of a location of bicycle 103 via mobile communication device 110 as one or more of an email, a text, and a notification. In certain embodiments, cyclist 150, through interaction with mobile application 282, may indicate that bicycle 103 is parked. This information may be relayed to server 170, wherein server application 272, upon receiving data from data hub 102 indicating that bicycle 103 is moving, may immediately send an alert to cyclist 150 (e.g., via mobile application 282 and mobile communication device 110).

Figure 4:
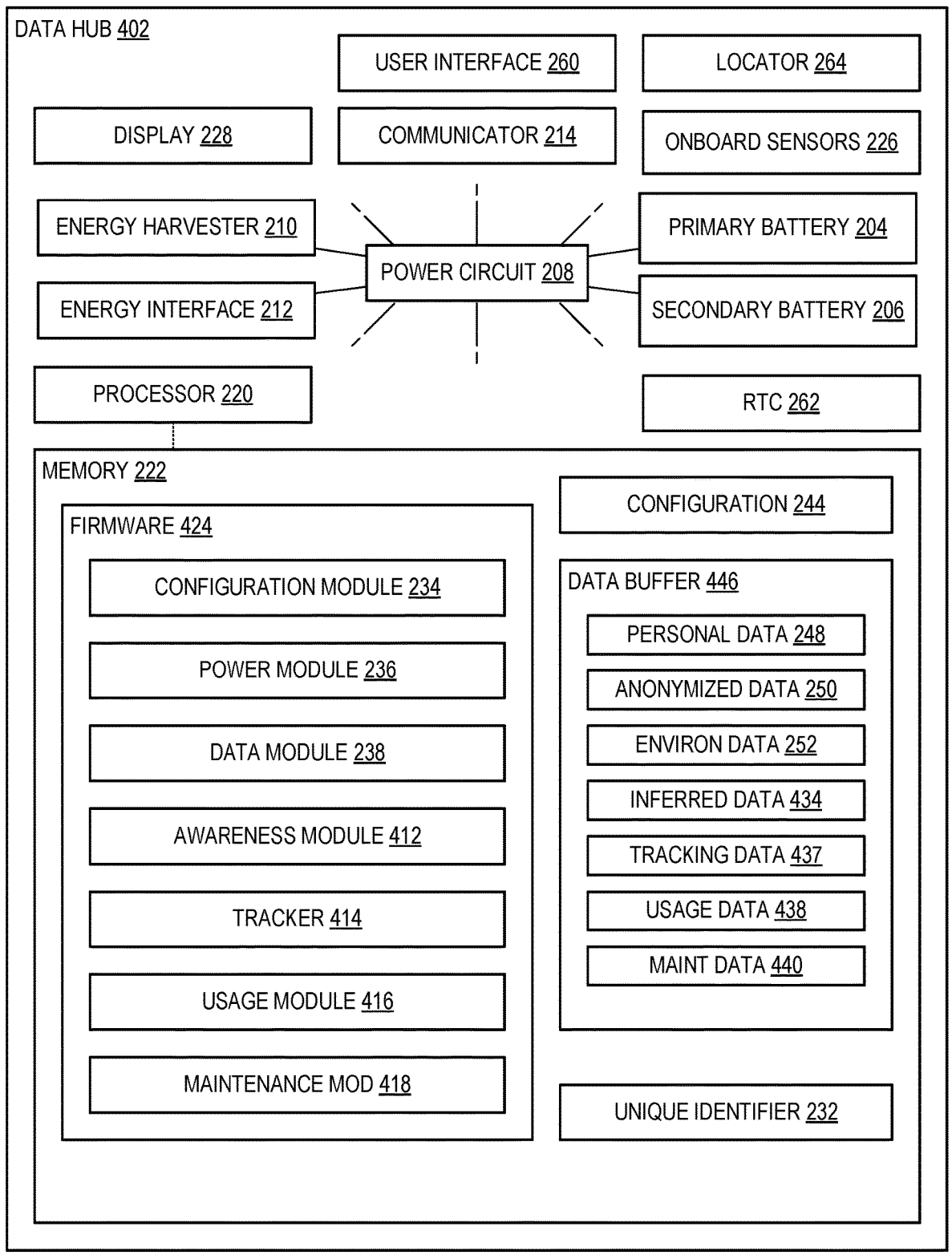
FIG. 4 is a schematic diagram showing detail of one example solar wireless collector beacon (data hub) that includes data analysis algorithms, in an embodiment.

Advanced Data Hub Performance

Where goals for data hub 102 is small and efficient, as available power (both electrical and processing) power increases in small computing devices, it is anticipated that functionality implemented by data hub 102 may also increase. Accordingly, FIG. 4 is a schematic diagram showing detail of one example solar wireless collector beacon (data hub) 402 that includes data analysis algorithms. Data hub 402 is similar to data hub 102 of FIG. 2, where like numbered elements have similar functionality and benefit from the above description of FIG. 2; accordingly, the description of which is not repeated.

Firmware 424 includes machine-readable instructions stored in memory 222 and, similar to firmware 224, includes configuration module 234, power module 236, and data module 238. Firmware 424 further includes an awareness module 412 that operates to process one or more of personal data 248, anonymized data 250, and environmental data 252 to infer additional states and activities of data hub 402, stored in data buffer 246 as inferred data 434. Awareness module 412 may have similar functionality as awareness module 312 of FIG. 3. Firmware 424 may further include a tracker 414 that functions similarly to tracker 314 and operates to generate tracking data 437 that defines path and timeline of movement of data hub 402. Firmware 424 may further include a usage module 416 that functions similarly to usage module 316 to generate usage data 438, stored in data buffer 446, that defines use and/or wear of a bicycle to which data hub 402 is integrated to attached, and/or components (e.g., brakes, gear selectors, chain, bearings, etc.) of the bicycle. Firmware 424 may further include a maintenance module 418 that functions similarly to maintenance module 318 to generate maintenance data 440, stored in data buffer 446, that defines at least maintenance performed on the associated bicycle.

Data hub 401 may transfer at least part of inferred data 434, tracking data 437, usage data 438, and maintenance data 440 to server 170 via one or more of mobile communication device 110, local hub 280, and service provider 112. Data hub 404 may display at least part of inferred data 434, tracking data 437, usage data 438, and maintenance data 440 on display 228 and/or transfer at least part of inferred data 434, tracking data 437, usage data 438, and maintenance data 440 to mobile communication device 110 for display.

Figure 5:
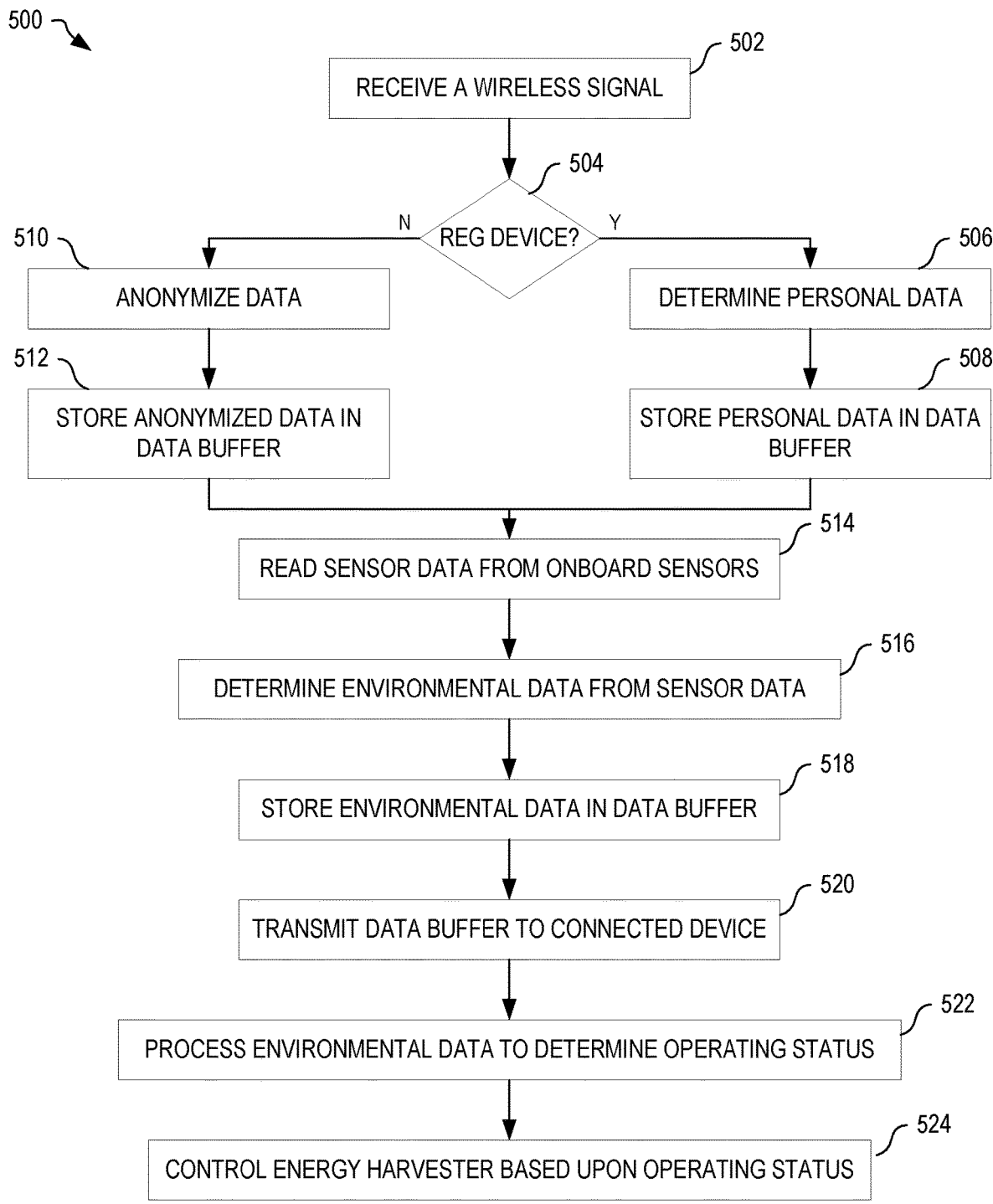
FIG. 5 is a flowchart illustrating one example solar wireless collector beacon (data hub) method, in an embodiment.

FIG. 5 is a flowchart illustrating one example solar wireless collector beacon (data hub) method 500. Method 500 is implemented in firmware 224 of data hub 102 and/or firmware 424 of data hub 402.

In block 502, method 500 receives a wireless signal. In one example of block 502, data module 238 causes processor 220 to control communicator 214 to receive one or more of wireless signals 121, 125, 129, and 133. Block 504 is a decision. If, in block 504, method 300 determines that the received wireless signal is from a device registered with the data hub, method 500 continues with block 506; otherwise, method 500 continues with block 510. In block 506, method 500 determines personal data from the wireless signal. In one example of block 506, data module 238 processes wireless signal 121 to determine power data 122 captured for cyclist 150 by data source 120. In block 508, method 500 stores the personal data in the data buffer. In one example of block 508, data module 238 stores personal data 248 tagged with a current date/time from RTC 262 in data buffer 246.

In block 510, method 500 anonymizes data received in the wireless signal, thereby generating anonymized data. In one example of block 510, data module 238 ignores identification information and data values of wireless signal 129, but determines that wireless signal 129 is from a power meter. In block 512, method 500 stores the anonymized data in data buffer 246. In one example of block 512, data module 238 stores anonymized data 250 tagged with a current date/time from RTC 262 in data buffer 246.

In block 514, method 500 reads sensor data from onboard sensors. In one example of block 514, data module 238 controls processor 220 to read one or more onboard sensors 226 (e.g., one or more of an accelerometer, a rate gyro, a magnetometer, a barometer, a temperature sensor, a light sensor, a humidity sensor, etc.) to determine characteristics of environment 104. In block 516, method 200 determines environmental data from the sensor data. In one example of block 516, data module 238 generates environmental data 252 from one or more of the sensor data determined from onboard sensors 226, and location data from locator 264. In block 518, method 500 stores the environmental data in the data buffer. In one example of block 518, data module 238 stores environmental data 252, tagged with a current time/date determined from RTC 262, in data buffer 246.

In block 520, method 500 transmits at least part of the data buffer to connected devices. In one example of block 520, data module 238 transmits, via communicator 214 and from data buffer 246, one or more messages 180 containing unique identifier 232 and one or more of personal data 248, anonymized data 250, and environmental data 252, to mobile communication device 110 and/or local Wi-Fi hub 280. The receiving device (e.g., mobile communication device 110 and/or local Wi-Fi hub 280) may then relay the data to server 170.

In block 522, method 500 processes at least part of the environmental data to determine an operating status of the data hub. In one example of block 522, power module 236 processes at least part of environmental data 252 to determine operating status 254 of bicycle 103 as riding on a downhill gradient. In block 524, method 500 controls energy harvester based upon the operating status. In one example of block 524, power module 236 controls energy harvester 210 to harvest energy at a high level when operating status 254 indicates that bicycle 103 is riding down a steep grade.

Figure 6:
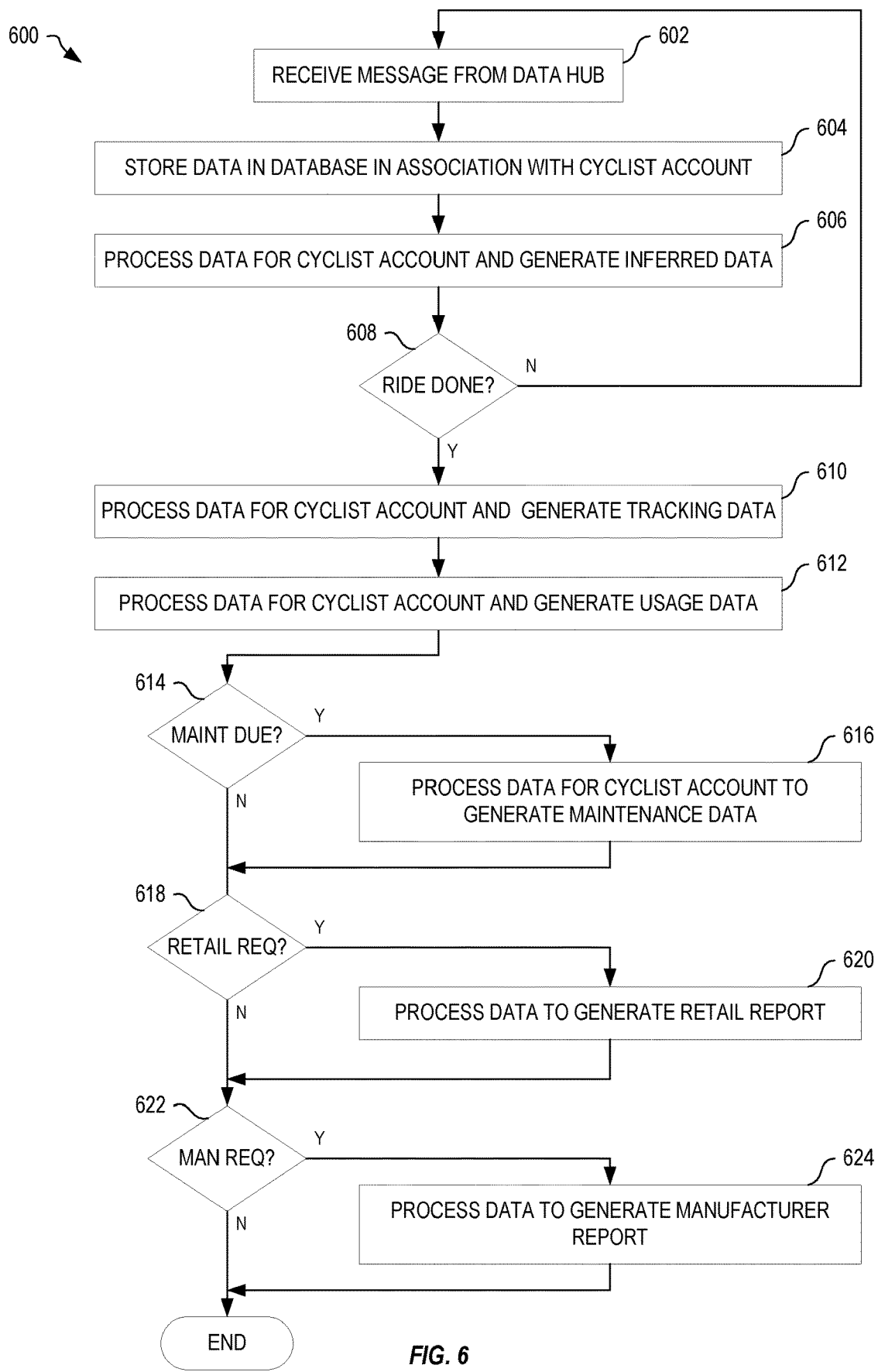
FIG. 6 is a flowchart illustrating one example method for receiving, storing, and processing, information from a data hub, in an embodiment.

FIG. 6 is a flowchart illustrating one example method 600 for receiving, storing, and processing, information from a data hub. Method 600 may be implemented in server application 272 of server 170 and/or, at least in part, in mobile application 282 of mobile communication device 110.

In block 602, method 600 receives a message containing data from a data hub. In one example of block 602, data module 310 receives message 180, containing one or more of personal data 248, anonymized data 250, and environmental data 252, from data hub 102. In block 604, method 600 stores the data from the message in the database in association with a user account. In one example of block 604, data module 310 stores one or more of personal data 332, inferred data 334, and environmental data 336, in cyclist account 330 of database 274 where cyclist account 330 has unique ID 232 that matches the unique ID contained within message 180.

In block 606, method 600 processes data of the user account and generates inferred data. In one example of block 606, awareness module 312 processes one or more of personal data 332, inferred data 334, and environmental data 336 and infers that cyclist 150 is riding with a group of other cyclists based upon continued presence of wireless signals from data sources that are not registered with data hub 102.

Block 608 is a decision. If, in block 608, method 600 determines that the ride is complete, method 600 continues with block 610; otherwise, method 600 continues with block 602. Thus, blocks 602-608 repeat to collect data of the ride.

In block 610, method 600 processes data of the cyclist account and generates tracking data of the ride. In one example of block 610, tracker 314 processes one or both of inferred data 334 and environmental data 336 and generates tracking data 337 defining a path and timeline of movement of data hub 102 and bicycle 103. In block 612, method 600 processes data of the cyclist account and generates usage data. In one example of block 612, usage module 316 analyzes one or more of personal data 332, inferred data 334, and environmental data 336 and generates usage data 338 indicative of usage and/or wear of bicycle 103 and/or components (e.g., brakes, gear selectors, chain, bearings, etc.) attached to bicycle 103 based upon measured conditions, type and severity of terrain, and so on.

Block 614 is a decision. If, in block 614, method 600 determines that maintenance is due, method 600 continues with block 616; otherwise, method 600 continues with block 618. In block 616, method 600 processes data of cyclist account to generate a maintenance report. In one example of block 616, maintenance module 318 processes usage data 338 and maintenance data 340 and generates maintenance report 342 indicative of maintenance recommended for bicycle 103 based upon use of bicycle 103.

Block 618 is a decision. If, in block 618, method 600 determines that a retailer has requested a retail report, method 600 continues with block 620; otherwise, method 600 continues with block 622. In block 620, method 600 processes data to generate a retail report. In one example of block 620, report generator 320 processes database 274 and generates retail report 346.

Block 622 is a decision. If, in block 622, method 600 determines that a manufacturer has requested a manufacturer report, method 600 continues with block 624; otherwise, method 600 terminates. In block 624, method 600 processes data to generate a manufacturer report. In one example of block 624, report generator 320 processes database 274 and generates manufacturer report 344.

Figure 7:
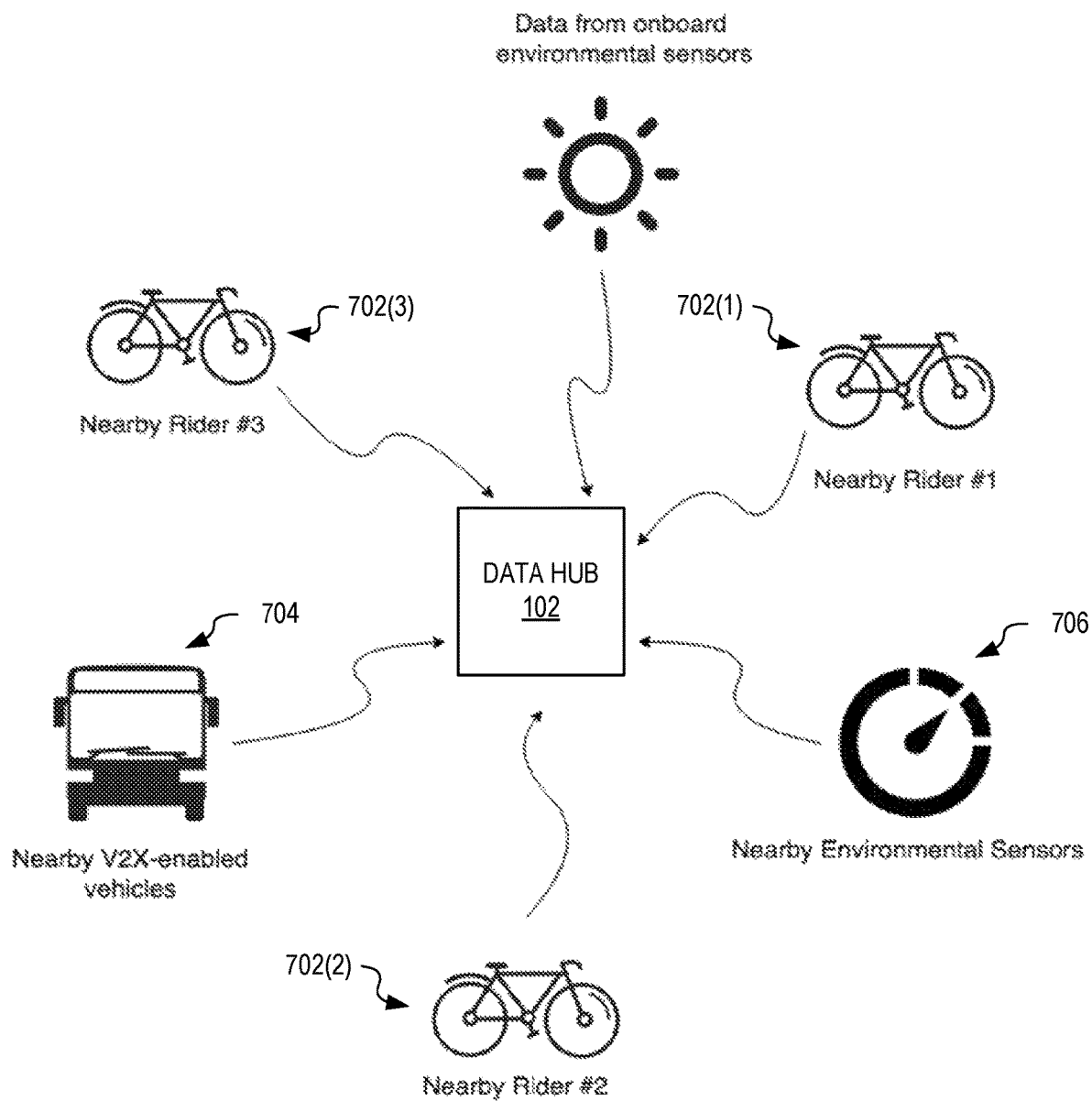
FIG. 7 is a schematic diagram illustrating data collection by the data hub of FIG. 1 in a sport application, in an embodiment.

FIG. 7 is a schematic diagram illustrating data collection by data hub 102 of FIG. 1 in a sport application. In this example, data hub 102 may be integrated into, or attached to, a bicycle (e.g., bicycle 103) that is being ridden in a cycle race. Data hub 102 collects data, such as temperature, humidity, and so on, of the race environment from onboard sensors 226. Data hub 102 also collects performance data (e.g., power, speed, cadence, and so on) from the bicycle and personal metrics (e.g., heartrate, breathing rate, perspiration rate, and so on) of the cyclist. Data hub 102 may also detect presence of other cyclists 702(1)-(3) in the race when their wireless signals are received (e.g., when they are within wireless range). In certain embodiments, as described above, data hub 102 may infer other status or situations from received wireless signals. Data hub 102 may also detect presence of vehicle 704 (e.g., a support vehicle or pace vehicle) when V2X wireless signals are received by data hub 102 from vehicle 704. Data hub 102 may also receive environmental data from other nearby environmental sensors 706 (e.g., IoT weather sensors, weather recorded via smartphone sensors and applications, sensors in the cyclists power-meter, heartrate monitor, sport watch, and bicycle head unit).

Data hub 102 may store this information within memory 222 (e.g., in data buffer 246) until after the ride completes, or may transfer at least part of the data to mobile communication device 110 if in range (e.g., carried by the cyclist) or to a vehicle via a B2X communication. Either, or both, of the vehicle 704 or mobile communication device 110 may relay data from data hub 102 to server 170.

Figure 8:
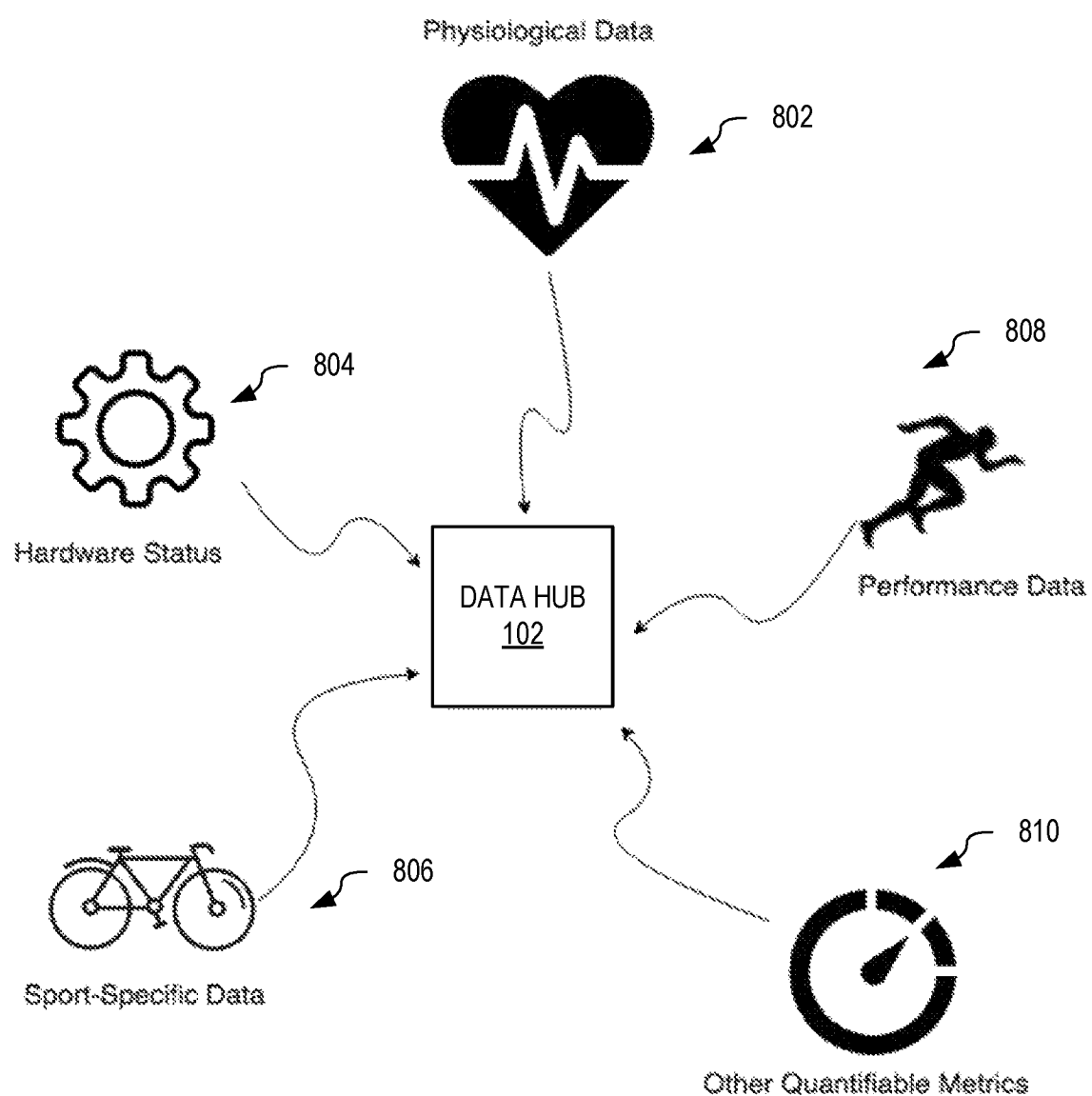
FIG. 8 is a schematic diagram illustrating example data collection by the data hub of FIG. 1 in a medical application, in an embodiment.

FIG. 8 is a schematic diagram illustrating example data collection by data hub 102 of FIG. 1 in a medical application. Data hub 102 may be attached to, or worn by, an individual and operates to collect data about that individual for medical purposes. For example, data hub 102 may collect physiological data 802 from physiological devices (e.g., heartrate, respiration rate, etc.). Data hub 102 may also collects hardware status data 804 from medical equipment used by the individual. For example, data hub 102 may collect an operating status (e.g., battery level, fault indication, etc.) of a pacemaker or insulin pump, and store and/or relay that information to server 170. Where the individual has be prescribed a certain exercise regime, data hub 102 may collect exercise data 806 from exercise and/or sports equipment used by the individual. Data hub 102 may collect other quantifiable metrics 810 that relate to the individual, and relay this data to server 170.

Figure 9:
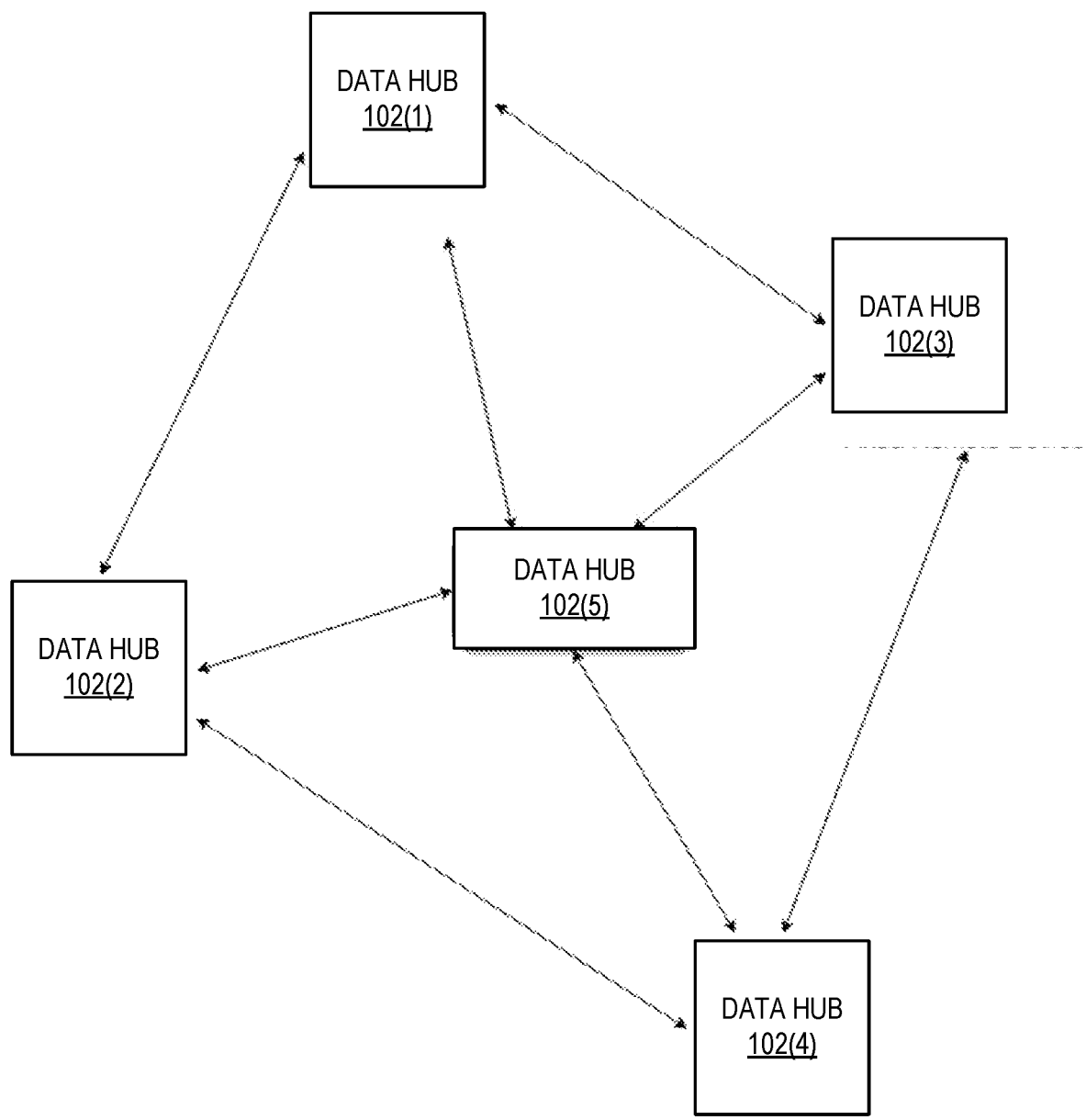
FIG. 9 is a schematic diagram illustrating example relative position tracking of multiple data hubs of FIG. 1 using time of flight and angle of arrival, in an embodiment.

FIG. 9 is a schematic diagram illustrating example relative position tracking by multiple data hubs 102 of FIG. 1 using time of flight and angle of arrival. In this example, data hubs 102(1)-(4) are at known locations. For example, data hubs 102(1)-(4) may each utilize a locator 264 to receive GPS signals to determine their respective locations. Alternatively, one or more of data hubs 102(1)-(4) are statically located and are aware of their geographic locations. Data hub 102(5) is attached to an object to be tracked. For example, data hub 102(5) may be attached to a valuable asset, be configured as a visitor's badge and worn by the visitor, be an employee badge, and so on. For convenience of size and power usage, data hub 102(5) may omit certain components (e.g., locator 264) and thereby have reduced capability (as compared to data hub 102 of FIG. 2). However, one or more of data hubs 102(1)-(4) may use time-of-flight capability to determine distance from data hub 102(5), such that, based upon at least three distance measurement and the know locations of data hubs 102(1)-(4), a location of data hub 102(5) may be determined. Advantageously, the network of data hubs 102(1)-(4) may track the location of the object to which data hub 102(5) is attached.

Figure 10:
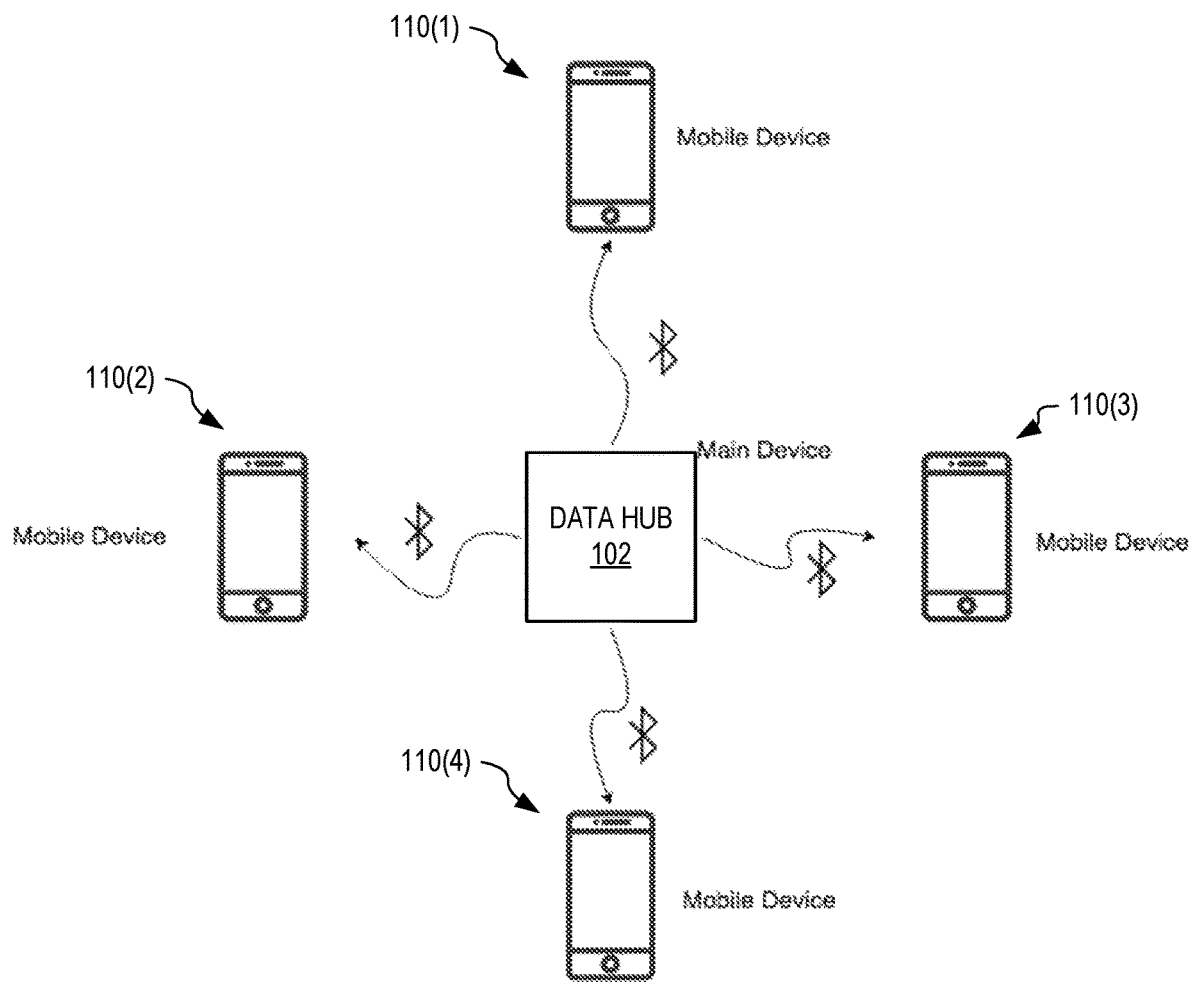
FIG. 10 is a schematic diagram illustrating example communication between the data hub of FIG. 1 and one or more cell phones or other network-enabled devices for data transfer and for finding lost data hubs and assets attached to lost data hubs, in an embodiment.

FIG. 10 is a schematic diagram illustrating example communication between data hub 102 of FIG. 1 and one or more mobile communication devices 110 (e.g., cell phones) or other network-enabled devices for data transfer and for finding data hub 102 (and assets attached thereto) when lost. In this example, each mobile communication device 110(1)-(4) runs mobile application 282 and may thereby communicate with data hub 102 (even though no specifically paired with data hub 102). For example, each mobile communication device 110(1)-(4) may be paired with other data hubs (not shown), but, when within wireless range of data hub 102, may receive messages therefrom. For example, where data hub 102 is configured to transmit, at intervals, a wireless signal beacon containing its unique identifier 232, when one or more of mobile communication device 110(1)-(4) are within wireless range of data hub 102, that mobile communication device 110 may receive the wireless signal beacon. Mobile communication device 110 may, upon receiving the wireless signal beacon, relay the received unique identifier 232 to server 170 with a current location of mobile communication device 110. Accordingly, server 170 may infer an approximate location of data hub 102 based upon the received location. Where data hub 102 is reported lost or stolen, server 170 may track the location of data hub 102 and inform a responsible party (e.g., the owner and/or law enforcement).

Figure 11:
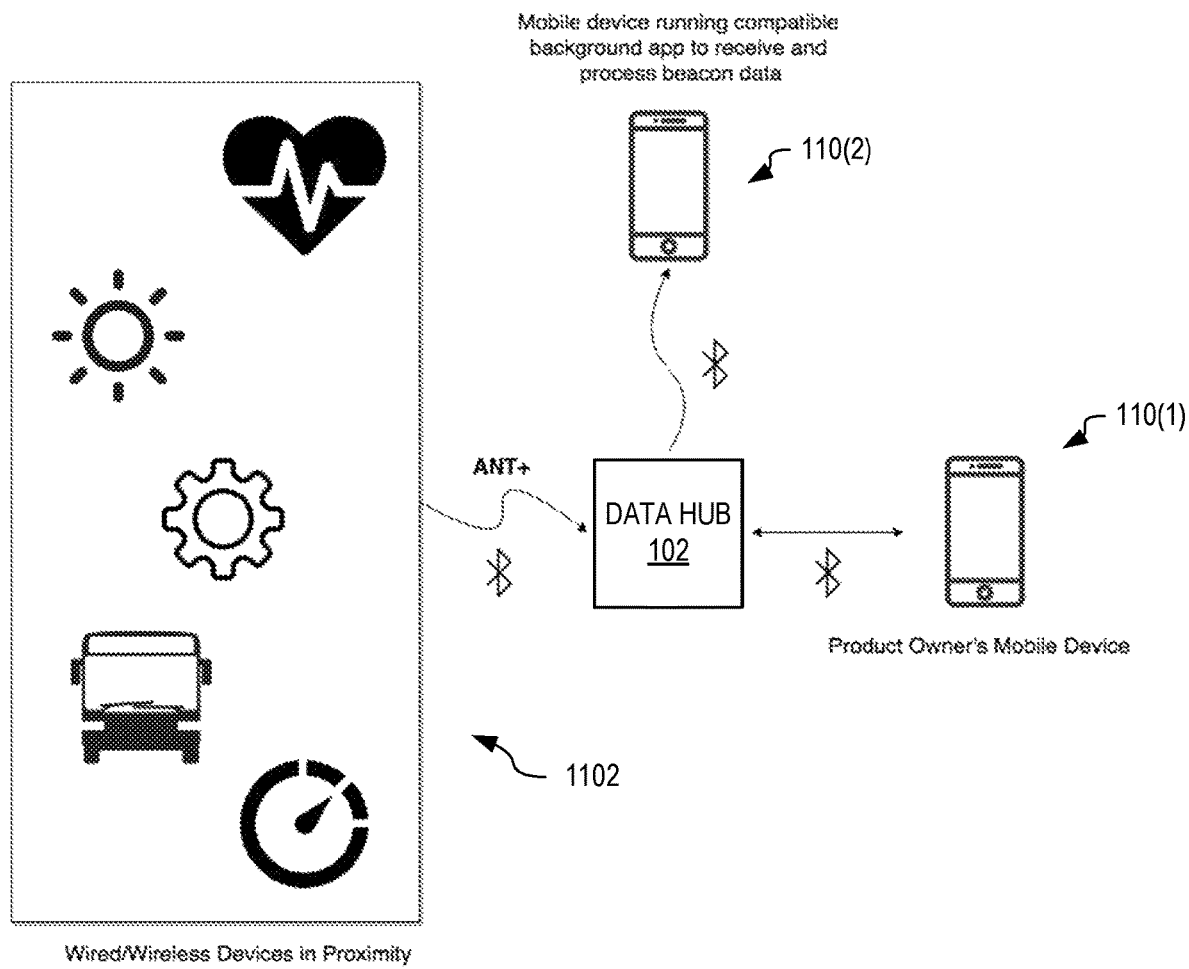
FIG. 11 is a schematic diagram illustrating example data collection using the data hub of FIG. 1 for data transfer to one or more of cell phones, and other network-enabled devices, and for locating lost data hubs, in an embodiment.

FIG. 11 is a schematic diagram illustrating example data collection using data hub 102 of FIG. 1 for data transfer to one or more mobile communication devices 110(1)-(2) (e.g., cell phones, and other network-enabled devices), and for locating data hub 102 when lost. In this example, data hub 102 collects data from a plurality of data sources 1102 (e.g., sports equipment, medical devices, environmental sensors, vehicles, and so on). Data hub 102 may then transfer the collected data to mobile communication device 110(1) (e.g., the owner's smartphone), wherefrom it may be relayed to server 170.

Figures 12, 13:
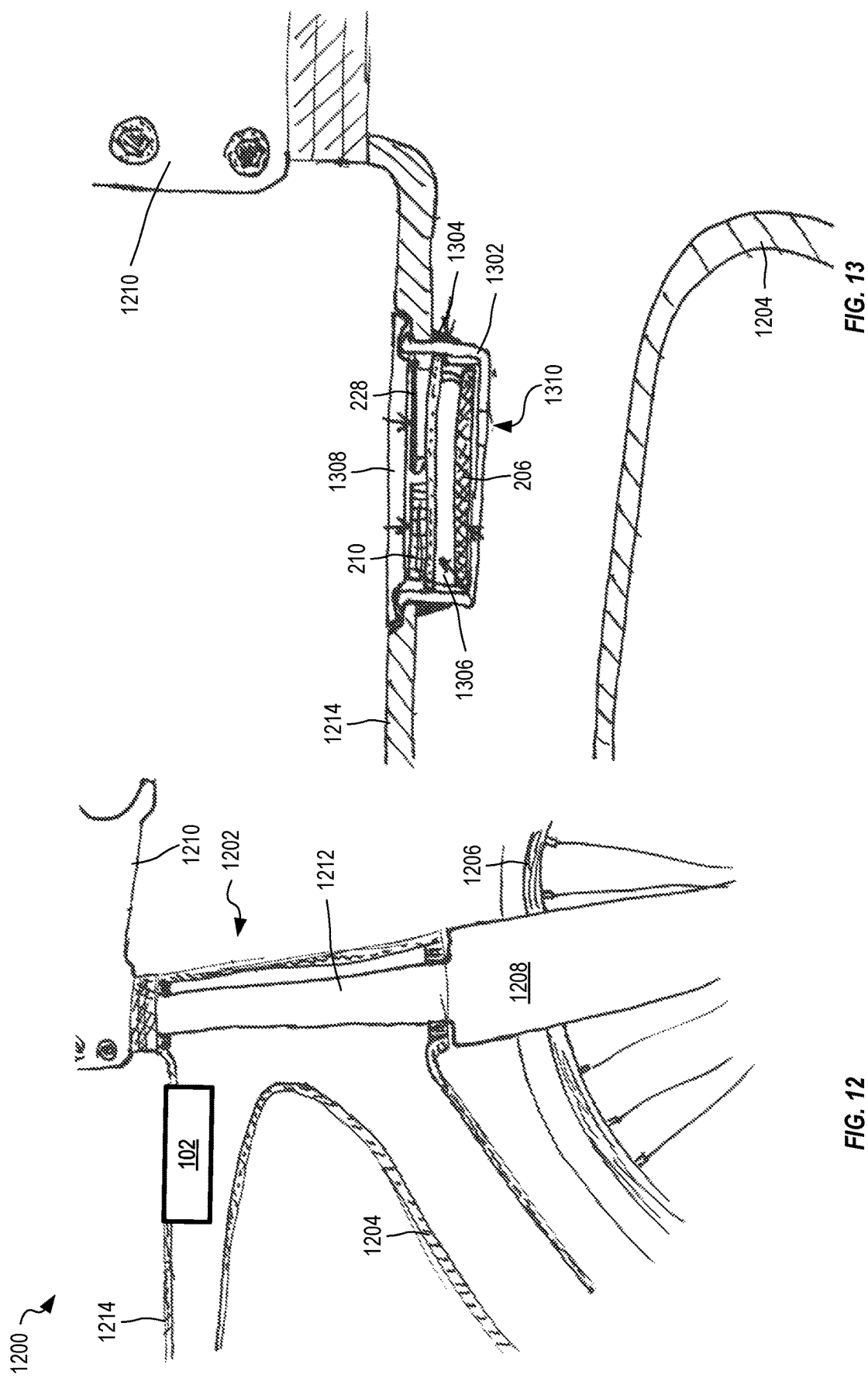
FIG. 12 is a cross-sectional schematic illustrating integration of the data hub of FIG. 1 into a head portion of a bicycle frame, in an embodiment.
FIG. 13 is a cross-sectional schematic illustrating further example detail of the integration of the data hub of FIG. 12, in an embodiment.

FIG. 12 is a cross-sectional schematic illustrating integration 1200 of data hub 102 of FIG. 1 into a head portion 1202 of a bicycle frame 1204. FIG. 13 is a cross-sectional schematic illustrating further example detail of the integration 1200 of data hub 102 of FIG. 12. FIGS. 12 and 13 are best viewed together with the following description.

FIG. 12 shows a portion of a front wheel 1206, front forks 1208, a stem 1210, a head tube 1212, and a cross-bar of a frame 1214. Integration 1200 of data hub 102 at a top surface of the cross-bar of frame 1214 allows cyclist 150 to easily interact with data hub 102, and allows solar type energy harvesters 210 to harvest energy from the sun. Data hub 102 may have an outer housing 1302, shown to include a printed circuit board 1306, secondary battery 206, energy harvester 210, and display 228. For clarity of illustration, not all components of data hub 102 are shown in FIG. 13, and housing 1302 may include other components (e.g., onboard sensors 226, communicator 214, power circuit 208, processor 220, memory 222, etc.), as part of printed circuit board 1306. As shown, housing 1302 fits within a recessed aperture of frame 1214 and is retained by retaining snaps 1304 such that a transparent cover screen 1308 is flush with an outer surface of frame 1214. As noted above, display 228 may be omitted without departing from the embodiments hereof.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A solar wireless collector beacon, comprising:
   a processor;
   a memory in electronic communication with the processor;
   a unique identifier stored in the memory;
   a communicator in electronic communication with the processor and operable to:
     communicate wirelessly using at least two different protocols,
     communicate through a network to a server, and
     identify other wireless devices near the solar wireless collector beacon;
   a plurality of onboard sensors configured to sense an environment of the solar wireless collector beacon, the plurality of onboard sensors including one or more of an accelerometer, altimeter, humidity sensor, photosensor, camera, satellite navigation receiver, and thermometer;
   at least one solar panel;
   a rechargeable battery;
   a power circuit for charging the rechargeable battery using power from the at least one solar panel and for powering the processor, the memory, the communicator, and the plurality of onboard sensors from power stored in the rechargeable battery;
   a housing, shaped to integrate with a vehicle, for containing the processor, the memory, the communicator, the plurality of onboard sensors, the at least one solar panel, the rechargeable battery, and the power circuit;
   a data buffer configured as part of the memory; and
   firmware, comprising machine-readable instructions stored in the memory that, when executed by the processor, control the processor to:
     receive, using the communicator and one of the at least two different protocols, a first wireless signal from a first data source registered with the solar wireless collector beacon, the first wireless signal defining first data,
     store the first data as personal data in the data buffer,
     receive, using the communicator and one of the at least two protocols, a second wireless signal from a second data source not registered with the solar wireless collector beacon, the second wireless signal defining second data;
     store the second data as anonymized data in the data buffer,
     determine, at intervals, a current location of the solar wireless collector beacon and store the current location in the data buffer,
     read, at intervals, sensor data from the plurality of onboard sensors and store the sensor data in the data buffer,
     determine an environmental status of the vehicle based at least in part upon the sensor data, and
     transmit, at intervals, a message including the unique identifier, the current location, and the environmental status, to a remote server.

2. The solar wireless collector beacon of claim 1, the at least two different protocols comprising ANT+ and Bluetooth low energy (BLE).

3. The solar wireless collector beacon of claim 2, the at least two different protocols further comprising one or more of IEEE 802.11p, LTE-V2X, and LTE-M.

4. The solar wireless collector beacon (data hub) of claim 1, further comprising:
   an energy harvester configured with the vehicle to harvest energy from the vehicle; and
   machine-readable instructions stored in the memory that, when executed by the processor, control the processor to:
     determine an operating status of the vehicle based at least in part upon the sensor data, and
     control the energy harvester to harvest energy when the operating status indicates that excess energy is available.

5. The solar wireless collector beacon of claim 4, the energy harvester being controlled to harvest energy when the operating status indicates one of: the vehicle is travelling downhill and the vehicle is braking.

6. The solar wireless collector beacon of claim 1, the housing being configured for integration with a frame of a bicycle during manufacture of the frame.

7. The solar wireless collector beacon of claim 6, the housing being sized to fit in a tube of the frame.

8. The solar wireless collector beacon of claim 6, the housing being permanently configured with the frame.

* * * * *